Patented Sept. 6, 1932

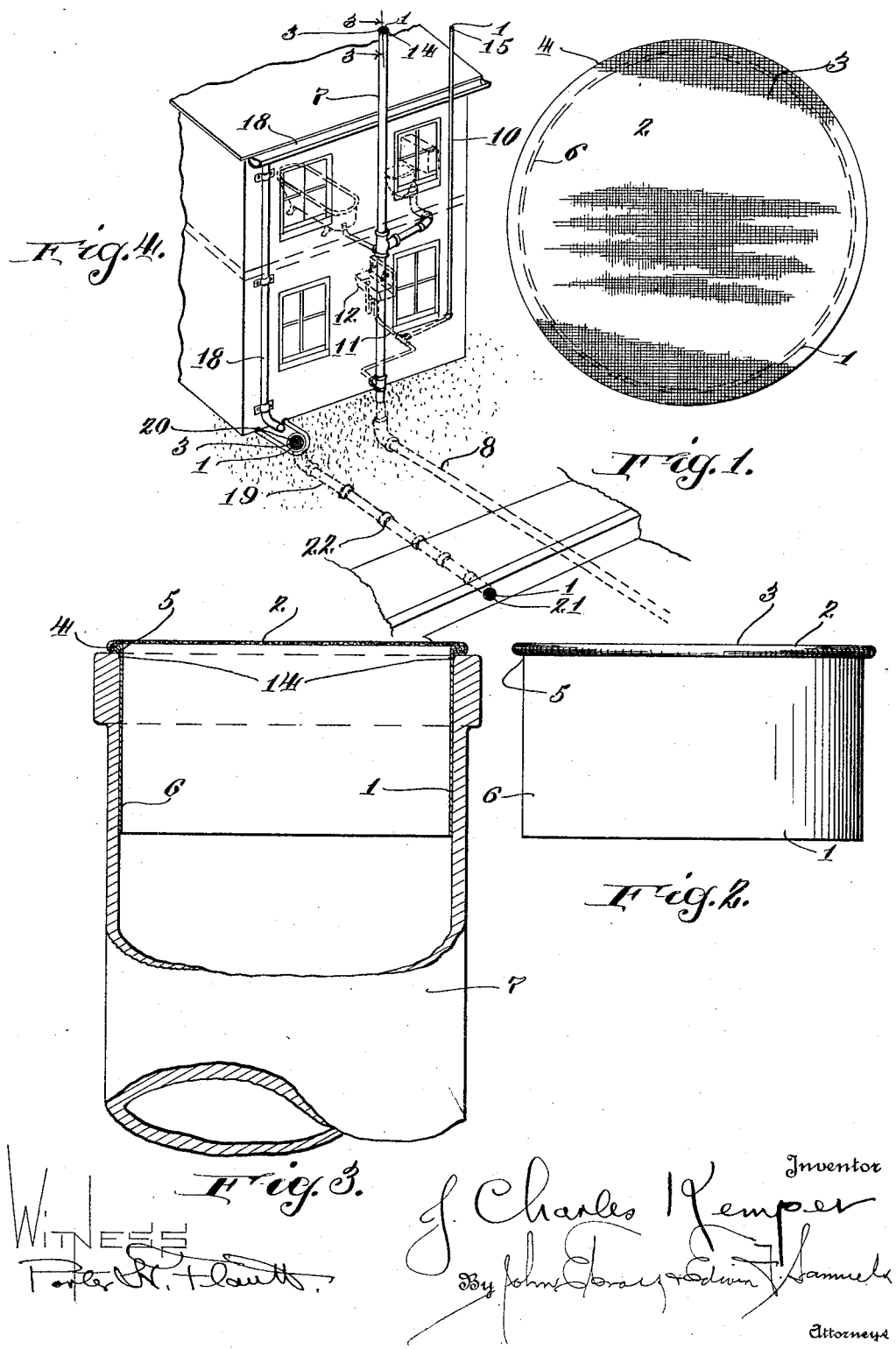

1,876,127

UNITED STATES PATENT OFFICE

JOHN CHARLES KEMPER, OF MOUNT WASHINGTON, MARYLAND, ASSIGNOR OF ONE-HALF TO ELLA C. KEMPER, OF MOUNT WASHINGTON, BALTIMORE, MARYLAND

MOSQUITO TRAP

Application filed April 10, 1931. Serial No. 529,007.

The present invention relates to a mosquito trap used in combination with a drain piping system for the purpose of completely sealing such systems in which mosquitoes may develop, without interfering with the proper venting of such systems and to prevent any egress therefrom of such mosquitoes.

I have discovered that mosquitoes in their earlier stages of development, or forms, such as during the egg and larva periods, do not seem to be wholly eradicated or affected by filtration systems used for filtering water for ordinary household purposes, but seem to pass through the piping of such water systems. Thus upon the drawing off of this water for household use and the passing of the same into the various drain pipes that lead to the underground sewer connection, there are numerous eggs and larva that accumulate in these drain pipes, which are at all times open to the atmosphere. This accumulation of mosquito eggs and larva, generally takes place on the side walls of the piping and particularly at the joints of the pipes, which present a favorable place and condition for the full development of the numerous mosquito eggs and larva to develop into full grown mosquitoes. Upon their complete development they leave the drain piping system by the different vent outlets.

It is the purpose of the present invention to provide means for preventing the egress of these mosquitoes from the drain piping system and at the same time not interfere with the purpose of the vent pipes, and their openings.

Still another purpose and object of the present invention is to provide a mosquito trap of the type described having means thereon that enables the trap member to be engaged to the opening of the vent pipe in a manner that makes the same substantially flush with the open end of the pipe. Thus preventing any possibility of the trap from being blown off due to little if any of the trap structure being exposed for the wind to obtain a purchase thereon.

In the accompanying drawing I have illustrated my invention in its preferred form.

In the drawing:

Figure 1 is a plan view of my invention of a mosquito trap as used in combination with a drain piping system.

Figure 2 is a side elevation of my invention as shown in Figure 1.

Figure 3 is a sectional view of my mosquito trap taken on the line 3—3 of Figure 4 showing the same as applied to the open end of one of the vent pipes in a drain piping system.

Figure 4 is a view shown somewhat in perspective disclosing a drain piping system as installed in and used by the average home, illustrating the application of my invention thereto.

Referring to the drawing by reference numerals, each of which represents the same or similar parts throughout the various views in the drawing.

My invention consists of a mosquito trap 1 having an upper surface 2 composed of interwoven wire mesh 3, the outer circumferential edge of which is formed into a rolled edge 4 together with the upper edge 5 of the depending cylindrical body portion 6. This rolled edge 4 forms a positioning shoulder for limiting the insertion of the trap into the vent pipe opening as shown in Figure 3.

Referring to Figure 3 of the drawing, it will be noted that my specific type of vent pipe closure or trap is of such a design as to be of pleasing appearance, of extreme simplicity, cheap to manufacture and very practical in structure and application in that it does not project from the pipe opening as shown, and therefore not susceptible to the elements when placed in the open end of a vent pipe.

In Figure 4 is illustrated one of the many ways in which my invention of a mosquito trap is used in combination with a drain piping system. The larger vent pipe 7 in this figure, acts as a vent for carrying off foul air and sewer gases from the underground sewer connection pipe 8. The smaller pipe 10 leading from the drain pipe 11 acts as an additional vent pipe for the kitchen sink 12, and is required in some localities for carrying off gases that may form in the piping 11 within the house proper. Both of these vent pipes 7 and 10 have openings at 14 and 15 through which the fully developed mosquitoes may escape. For purposes of preventing the free egress of these mosquitoes through these openings 14 and 15, I place therein my mosquito trap 1 as shown.

For carrying off the rain water from the rain spout structure 18, an underground pipe 19 is shown, having open ends 20 and 21. These open ends are each provided with mosquito traps 1. Thus preventing the egress from the underground pipe 19 of mosquitoes that may develop therein. It being understood that the eggs and/or larva enter this passage through the screen portion of the trap adjacent the rain spout outlet and develop in the joints 22 of the pipe 19 or in the stagnant water that may accumulate therein.

As may be readily seen this use of my trap in combination with sewer and vent piping systems will absolutely prevent the mosquitoes bred in these favorable breeding spots from gaining access to the outside atmosphere.

I have thus described specifically and in detail a device used in combination with sewer and vent piping systems to prevent the egress therefrom of mosquitoes, the device is shown in its preferred form in order that the manner of constructing, applying and using the same may be fully understood, however, the specific terms herein are used descriptively rather than in a limiting sense, the scope of the invention being defined in the claims.

What I claim as new and desire to secure by Letters Patent is:

1. A mosquito trap having a substantially flat piece of interwoven wire mesh on the top thereof, a cylindrical body portion depending therefrom and fixed thereto, a positioning shoulder formed on said trap in the form of a rolled edge at a point where the wire mesh is engaged to the cylindrical body portion, the rolled edge being adapted to secure the wire mesh to the body portion.

2. A mosquito trap having a substantially flat piece of interwoven wire mesh on the top thereof, a cylindrical body portion depending therefrom, and fixed thereto, a positioning shoulder formed on said body portion in the form of an outwardly rolled edge at a point where the wire mesh is engaged to the cylindrical body portion, the rolled edge being adapted to secure the wire mesh to the body portion, the wire mesh being substantially flush with said positioning shoulder whereby a maximum mosquito trap cover is obtained with a minimum portion thereof projecting beyond the positioning shoulder.

Signed at Mount Washington, Baltimore, Maryland, this 9th day of April, 1931.

J. CHARLES KEMPER.